(12) United States Patent
Koning et al.

(10) Patent No.: US 6,834,822 B2
(45) Date of Patent: Dec. 28, 2004

(54) MECHANICAL SHIFTING OF MULTI-LOAD RETRACTOR

(75) Inventors: Richard W. Koning, Yale, MI (US); Michael J. Moore, Attica, MI (US); Kenneth H. Kohlndorfer, Roseville, MI (US); Mark F. Gray, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/401,248

(22) Filed: Mar. 27, 2003

(65) Prior Publication Data

US 2003/0201357 A1 Oct. 30, 2003

Related U.S. Application Data

(60) Provisional application No. 60/376,103, filed on Apr. 27, 2002.

(51) Int. Cl.[7] .................. B60R 22/28; B60R 22/405
(52) U.S. Cl. ...................... 242/379.1; 242/383.4; 242/384.6
(58) Field of Search .............. 242/379.1, 383.4, 242/384.6; 280/805, 806; 297/478

(56) References Cited

U.S. PATENT DOCUMENTS

| | | | |
|---|---|---|---|
| 6,012,667 A | | 1/2000 | Clancy, II et al. ....... 242/379.1 |
| 6,206,315 B1 | * | 3/2001 | Wier ....................... 242/379.1 |
| 6,241,172 B1 | * | 6/2001 | Fugel et al. ............. 242/379.1 |
| 6,260,782 B1 | * | 7/2001 | Smithson et al. ........ 242/379.1 |
| 6,290,159 B1 | | 9/2001 | Specht et al. ............ 242/379.1 |
| 6,360,980 B1 | * | 3/2002 | Lee ......................... 242/379.1 |
| 6,416,006 B1 | * | 7/2002 | Huber ...................... 242/379.1 |
| 6,454,201 B1 | * | 9/2002 | Strobel et al. ........... 242/379.1 |
| 6,564,895 B1 | * | 5/2003 | Bohmler ...................... 280/806 |
| 6,616,081 B1 | * | 9/2003 | Clute et al. ............. 242/379.1 |
| 2003/0034644 A1 | | 2/2003 | Wier ........................... 280/806 |

* cited by examiner

Primary Examiner—John M. Jillions
(74) Attorney, Agent, or Firm—Markell Seitzman

(57) ABSTRACT

A seat belt retractor comprising: a first and a second energy absorption mechanism each of which is selectively activatable and respectively configured to generate first and second levels of energy absorption and when activated define an output characteristic of the retractor; a switch mechanism for operatively selecting one or the other energy level and a mode shifter for shifting between the first energy absorption level and the second energy absorption level as a function of the rotation of a spool of the retractor.

21 Claims, 10 Drawing Sheets

MECHANICAL SHIFTING OF MULTI-LOAD RETRACTOR

This is a regularly filed utility patent application claiming priority of provisional patent application 60/376,103, filed Apr. 27, 2002.

BACKGROUND AND SUMMARY OF THE INVENTION

The present invention generally relates to seat belt retractors having energy-absorbing or dissipating mechanisms and more particularly to a multi-level load-limiting system, which includes a means for shifting the output characteristic of the retractor from one load level limit to another load level limit based on operational parameters.

Torsion bars have for decades been proposed for use in seat belt retractors as an energy absorbing/dissipating mechanism. As the torsion bar is twisted (absorbing or dissipating energy as the case may be) during a vehicle emergency, the retractor output, that is, the torque or force displacement (rotation) characteristic of the torsion bar quickly reaches a saturated region, which corresponds to its plastic range of operation. This somewhat constant characteristic provides a reaction torque at the retractor and provides a reaction force or load on the seat belt, which retards and controls the manner by which the seat belt protracts from the spool. One level of reaction forces may not be adequate to protect occupants of differing sizes. Consequently, it is desirable to provide a seat belt system with more than one load-limiting characteristic or one that can be changed or changes as dynamic conditions change.

The prior art illustrates seat belt retractors having two dissimilar and remotely located torsion bars to achieve a multi-level of load limiting, while other prior retractors use a single torsion bar that is sub-divided into two torsion bar portions to achieve multi-level load-limiting operation.

The present invention utilizes at least two energy dissipating/absorbing mechanisms to provide a system that can achieve performance standards in new United States Federal regulations (see FMVSS 209) as it relates to $5^{th}$, $50^{th}$ and $95^{th}$ percentile sized occupants. In the context of the present invention energy absorption and dissipation are the same.

In one embodiment the retractor employs a friction generating device which is set to generate a belt reaction force in the range of about 2–3 kN. This level of energy absorption is employed when a $95^{th}$ percentile occupant is using the system during frontal crashes at or below a first crash level. A torsion bar is used as a second energy-absorbing or dissipating mechanism to generate a protective force for all occupants during high-speed crashes. The torsion bar reaction torque is set to a range of about 4–6 kN. The default mode of operation of the invention is to use the torsion bar.

As will be seen one of the advantages of the invention is that even if the retractor were to start off in its low energy mode of operation, it is designed to automatically revert to the high level of energy absorption after the seat belt has been extended, for example during a crash. The invention also includes a means for disabling the energy absorbing feature of the torsion bar when an occupant of a slight size is using the seat belt system and more particularly disabling the locking pawl associated with the torsion bar as a means for entering the friction mode of operation.

By way of background, a classic seat belt retractor only offers a modest degree of energy absorption, which occurs as the relatively stiff seat belt stretches as it is loaded by the occupant during an emergency.

It is an object of the present invention to provide to provide a multi-level energy-absorbing seat belt retractor.

The present invention advantageously utilizes the combination of the characteristics of the torsion bar and a friction generating mechanism to provide a multi-level seat belt load-limiting system.

Many other objects and purposes of the invention will be clear from the following detailed description of the drawings.

DETAILED DESCRIPTION OF THE DRAWINGS

Figures 1, 2:
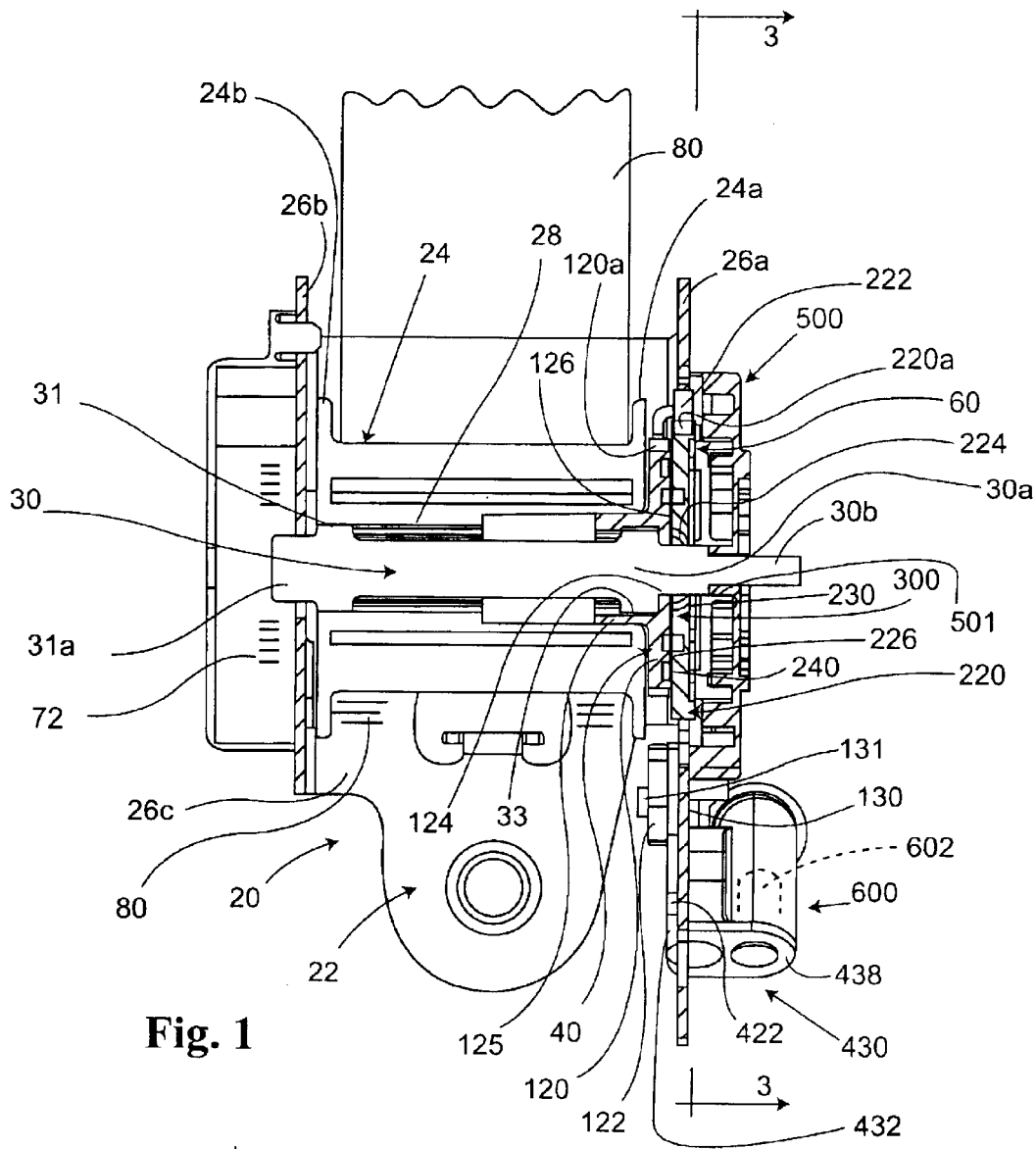
FIG. 1 is a cross-sectional view, which illustrates many of the major components of a first embodiment of the invention.
FIG. 2 shows the force displacement curve for the variable elongation webbing incorporated in the retractor.

Reference is made to FIG. 1, which shows the major components of a seat belt retractor 20 incorporating the present invention. The retractor includes a frame 22 upon which a spool 24 is rotatably mounted between sides 26a and 26b of the frame 22. The sides 26a,b span a back 26c frame part. The spool includes a central passage 28 for receipt of a torsion bar 30. In this embodiment the torsion bar also acts as the spool shaft. As will be seen the retractor 20 is an ELR retractor, which can be coupled to an optional ALR switching mechanism. As is known ELR stands for emergency locking retractor and ALR stands for automatically locking retractor.

The torsion bar is connected via a splined connection 31 to or near one end 31a of the spool. End 31a of the torsion bar is also connected to a rewind spring 72 through a spring arbor. The spring arbor 72a is shown in FIG. 3a and is commonly used to connect the rewind spring to the retractor shaft (torsion bar). As the spool is loaded it twists the torsion bar and rotates relative to the torsion bar. The twisting of the torsion bar generates a reaction force, which is used to control the payout of the seat belt during an accident. A quantity of seat belt or webbing 80 is mounted or rotated onto the spool 24. Spool flanges 24a and 24b center the seat belt 80 on the spool.

A seat belt system using the present retractor will include a tongue, which is mounted to the seat belt and a buckle in which the tongue can be locked in place (the tongue and buckle are not shown in the figures). As is known, the retractor 20 can be mounted within a vehicle seat or secured to the floor or one of the pillars of a vehicle.

Figure 10A:
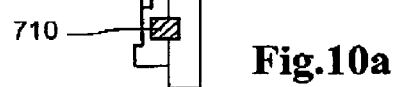
FIGS. 10a–c show various views of a torsion bar rotation counter mechanism.
Figure 10B:
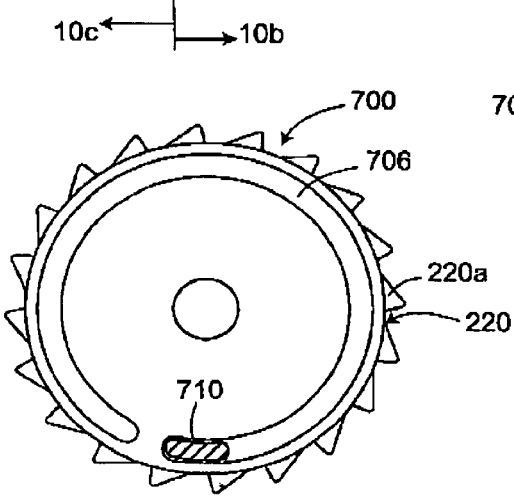
Figure 10C:
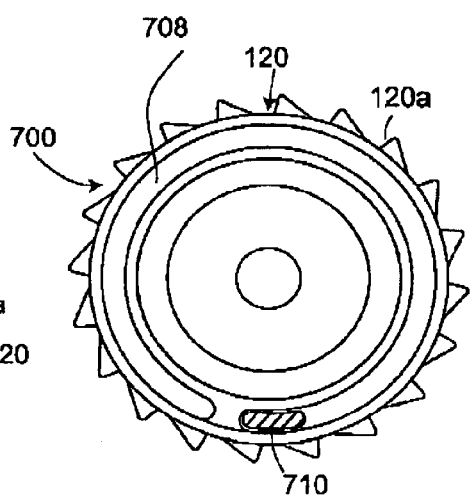

In addition to the torsion bar, the retractor 20 also includes a second energy-absorbing mechanism (also shown in FIGS. 10a–c). This second energy-absorbing mechanism is preferably a friction-generating mechanism 300. FIG. 2 schematically shows the forces generated by the torsion bar and the friction mechanism.

The retractor includes a first locking mechanism 40, which includes lock wheel 120 and a mating first lock pawl 122. The lock wheel includes lock teeth 120a about its periphery and the lock pawl includes at least one lock tooth 122a. In this embodiment the first lock wheel 120 is connected to the torsion bar 30 through a splined connection 33 near side or end 30a of the torsion bar. The right-hand end 30a of the spool is stabilized on an inner circular flange 125 of the lock wheel 120. The torsion bar extends through a center opening 124 in the lock wheel 120. Lock wheel 120 also includes a flat radial or engagement surface 126 on an outside face portion thereof.

Figure 3:
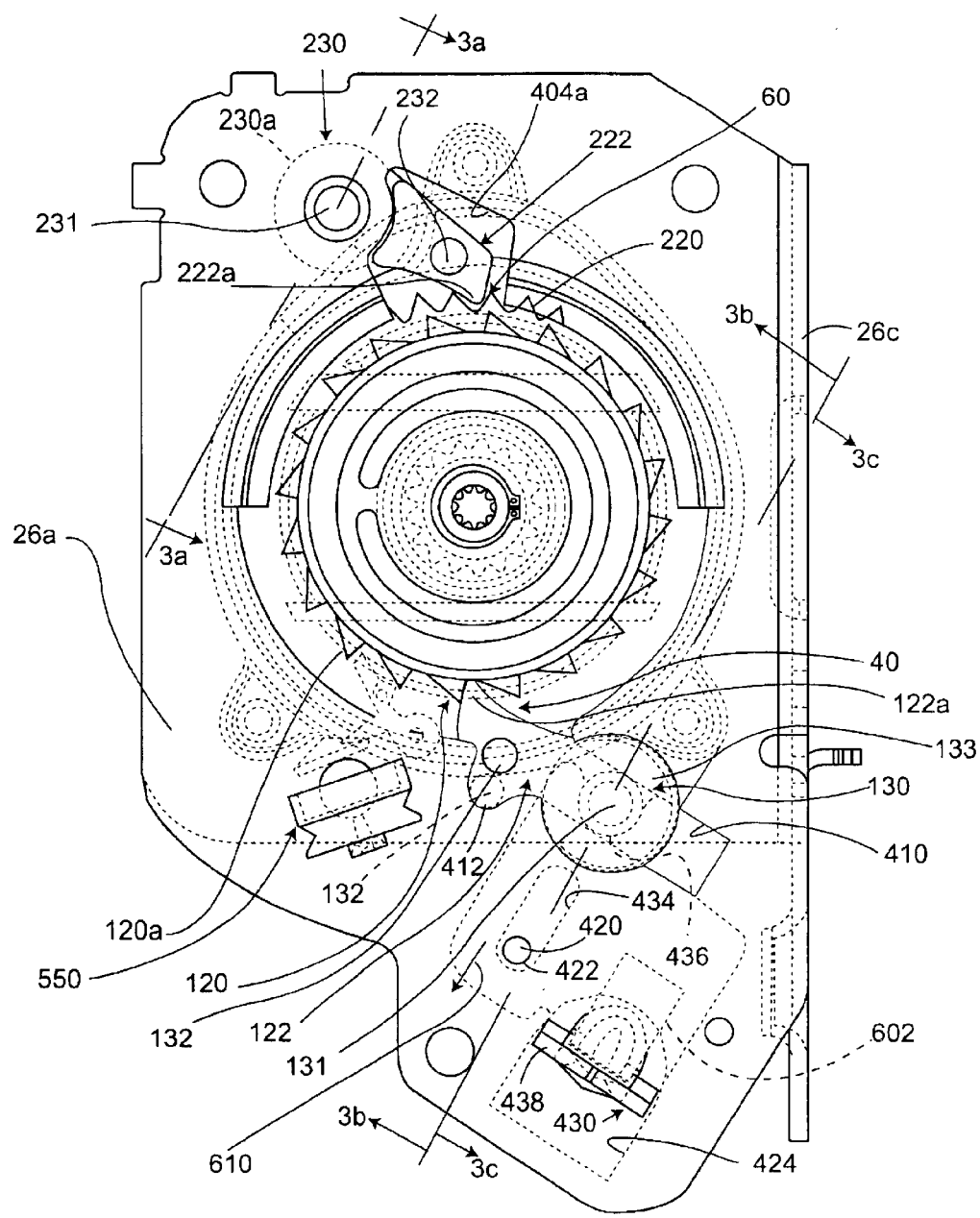
FIG. 3 is a plan view of a modified mechanism side of the retractor showing the placement of the lock wheels and pawls.
Figure 3A:
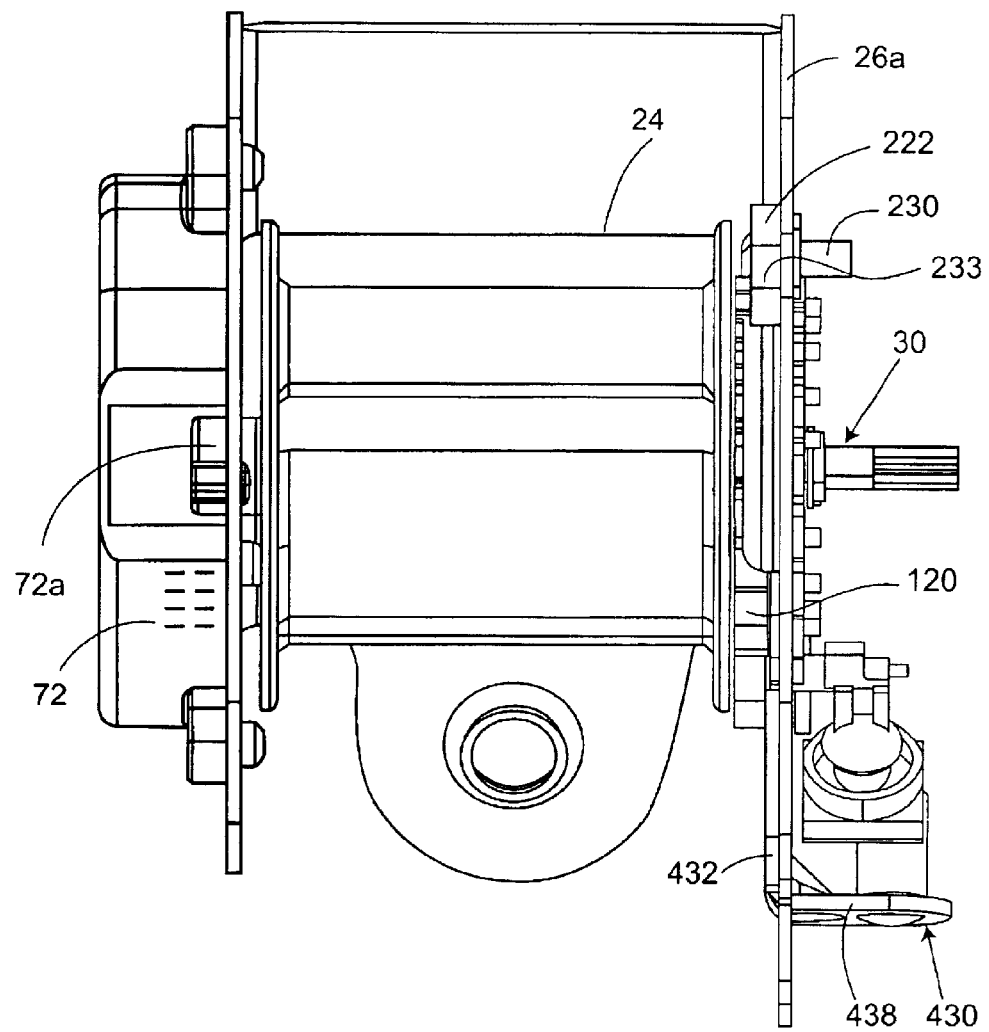
FIG. 3a is a partial cross-sectional view taken through section line 3a—3a of FIG. 3 highlighting the placement of a lock pawl (the lock ring has been removed).
Figure 3B:
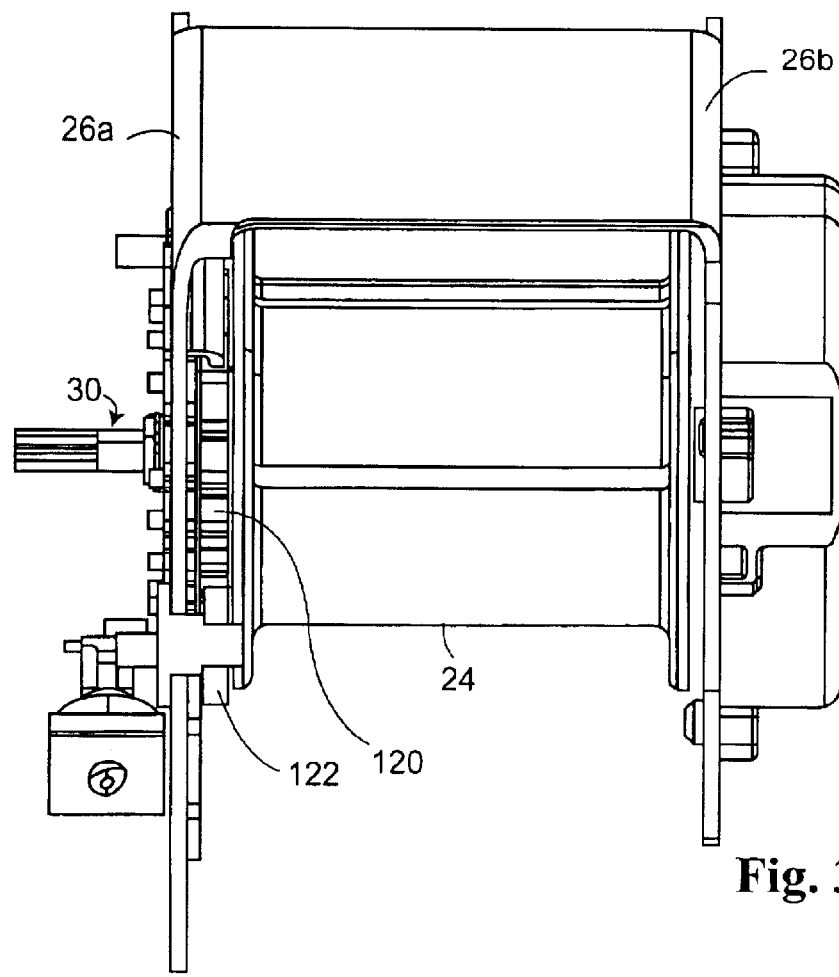
FIG. 3b is a partial cross-sectional view taken through section line 3b—3b of FIG. 3 highlighting the placement of a second lock pawl (the lock ring has been removed).
Figure 3C:
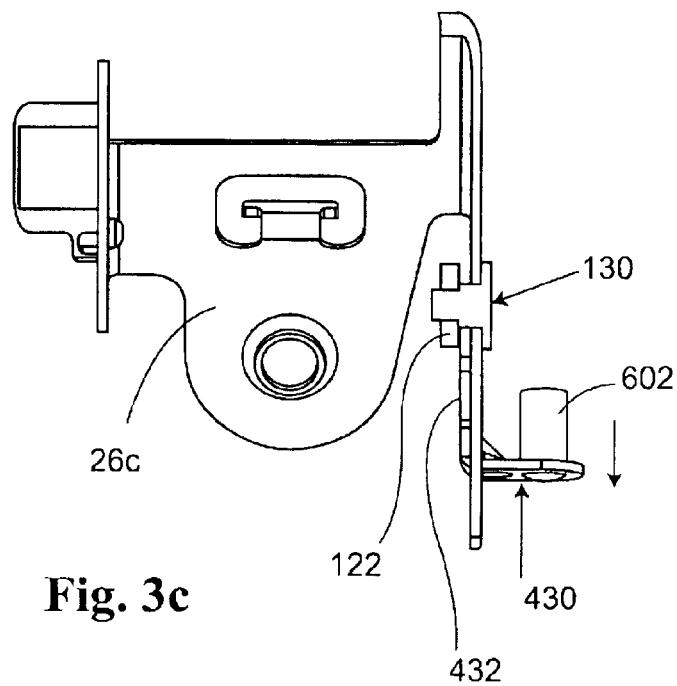
FIG. 3c is a partial cross-sectional view taken through section line 3c—3c of FIG. 3 highlighting a plate member which supports the second lock pawl.
Figure 4:
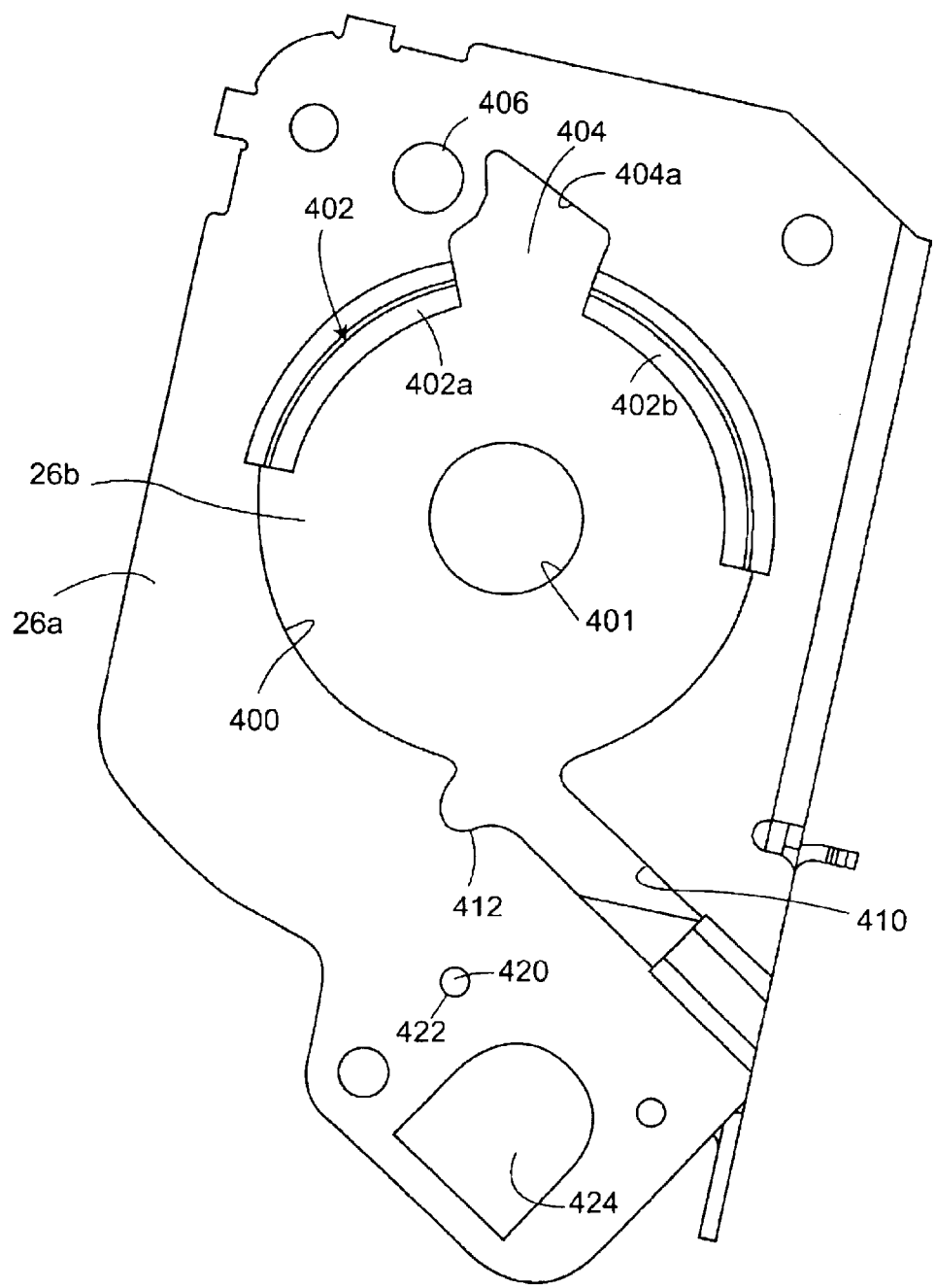
FIG. 4 is a plan view of one of the sides of the frame of the retractor.

The first lock pawl 122 is rotationally supported relative to frame side 26b via a pin or rivet shaft 131 of rivet or post 130 (see FIGS. 3 and 3a). As will be seen this support is removable. The lock pawl 122 also includes a cam pin (also referred to as a cam follower) 132, see FIG. 3. The lock pawl 122 and in particular the cam pin 132 engages and is moved by a lock ring 500. An extending end 30b of the torsion bar extends through the lock ring. The lock ring 500 is rotationally supported on the portion 30b at a bushing 501 (defined by a small opening in the center of the lock ring). Additionally, as discussed below, the same lock ring 500 is used to move another lock pawl 222 (associated with lock wheel 220).

A second lock mechanism 60 is associated with a friction-generating mechanism (friction mechanism) 300. The lock mechanism 60 includes a second lock mechanism (friction mechanism) 300. The lock mechanism 60 Includes a second lock wheel 220. The lock wheel 220 includes lock teeth 220a, a center opening 224 through which the torsion bar 30 also extends and a flat engagement surface 226. The second lock wheel 220 is rotationally mounted on the torsion bar. Surface 126 and the opposing surface 226 are pressed against each other and can be biased toward each other by a spring 230, which is held fixed on one side. In one embodiment a Belleville washer is used as spring 230. The surface finishes of the engagement surfaces 126 and 226 can be textured to achieve the desired level of friction force when the surfaces 126 and 226 rotate relative to one another. Alternately one or both of the engagement surfaces can be covered with a friction-generating material 240. For example, this friction-generating material can be the same as the material used on vehicle brakes including carbon, carbon fiber or, for example, a resin-impregnated fiberglass, etc.

The second lock mechanism 60 further includes the second lock pawl 222. Lock pawl 222 includes one or more lock teeth 222a, which engage one or more of the lock teeth 220a and a cam pin 232 (received within a cam slot of the lock ring).

The placement and operation of the lock pawl 222 differs from that of the lock pawl 122. The lock pawl 222 is mounted and rotates relative to frame side 26a (as shown in FIG. 3a) about a fixed pivot or pivot point. This is not the case for pawl 122.

In this embodiment when only lock mechanism 60 (pawl 222 and lock wheel 220) is activated the load limiting of the retractor is defined by the friction characteristics of the friction mechanism or friction clutch 300. This mode of operation is used for smaller occupants. For larger occupants both locking mechanisms are activated and the spool 24 rotates (or rather twists and rotates with) the torsion bar 30. In the illustrated embodiment the load-limiting characteristic of the torsion bar 30 is set higher than the load limiting achievable by the friction mechanism 300 (see FIG. 2). The friction force can be modified by changing the bias force of the spring 230.

As can be seen, the torsion bar related and the friction generator related lock pawls 122 and 222 are shown in FIG. 1 adjacent corresponding lock wheels 120 and 220. By the selective activation of one or both of the pawls, the desired operational mode of the retractor can be achieved. If both locking pawls 122 and 222 are activated the lock wheels are fixed relative to one another and no friction forces can be generated. However, since the spool 24 is free to rotate and twist the torsion bar and the load absorption (load limiting, load dissipating forces) will be defined by the characteristics of the torsion bar 30.

An occupant classification system of known type provides an output or control signal to identify whether the occupant (using the retractor) is a small ($5^{th}$ percentile) occupant or a larger occupant (greater than $50^{th}$ percentile). Occupant classification systems while new are generally well known in the art. Once the presence of a small occupant is determined, and if the vehicle is involved in an accident, the locking mechanism associated with the torsion bar is deactivated, more precisely, the lock pawl 122 is moved out of the way of lock wheel 120 by activating a pyrotechnic unit 600. Consequently, during this mode of operation reaction forces will be proportional only to the forces and torques generated by the friction-generating mechanism 300. The mechanism to achieve the mounting of the lock pawl 122 is identified below.

Reference is made to FIGS. 4, 5, 6 and 7, which show more details of the invention. Frame side 26a includes a large central opening 400. Frame side 26b includes a small opening 401, which is visible in FIG. 4. A partial circular split flange 402 is recessed from the generally flat plane of the frame side 26a and extends about the opening 400. The opening 400 includes an upwardly extending cutout or opening 404, which divides the flange 402 into parts 402a and 402b. Adjacent the opening extension 404 is a circular opening 406. The lock pawl 222 is movable on the inside of frame side 26a (see FIG. 3a). The cam pin 232 of pawl 222 extends into the opening 404 and the top surface 404a of opening 404 will act as a motion stop. The head 230a of the rivet 230 is located on the outer side of the frame side 26a. As can also be seen the shaft 231 of the rivet 230 includes a shoulder 233 (see FIG. 3a) to properly locate the lock pawl 222 relative to the inside surface of the frame side 26a.

The frame side 26a, generally opposite the cutout 404, includes an elongated slot 410 and a notch 412. The notch 412 is generally semi-circular in shape. Positioned below the slot 410 is at least one locating pin 420, which extends through (an opening 422) to the inside surface of the frame side 26a. Located adjacent the pin 420 is a larger opening 424. The pin 420 and the slot 424 guide the motion of a plate member 430.

Figure 5:
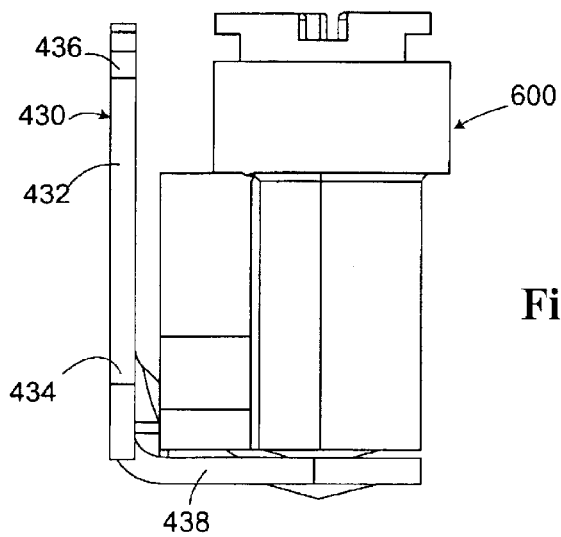
FIG. 5 is a plan view showing a plate member with a pyrotechnic element theron.

As will be seen, the other lock pawl 122 is loosely mounted to a slidable plate member 430 (also shown in FIG. 5). The plate member 430 includes a flat portion 432 having an elongated slot 434 and a semi-circular groove or shoulder 436 (see FIG. 3) at an upper edge of portion 432. The plate member 430 also includes a flange 438, which extends generally perpendicularly away from the flat portion 432. The flat portion 432 of the plate member 430 is placed against the inside surface of the frame side 26a with the flange 438 extending out through opening 424 in the frame side. With the flange 438 positioned at the top of the large opening 424, the pin 422 is located near the bottom of the elongated slot 434 and the shaft 131 of the rivet 130 is at the bottom of the semi-circular groove 436 (which acts as support for the shaft about which the pawl 122 can pivot).

The head 133 of the rivet or pin 130 rests on the outer surface of the frame side. The lock pawl 122 is secured to the shaft 131 of rivet 130 and can pivot thereabout. When the pawl is in a non-activated position its cam pin 132 can rest on the smaller semi-circular opening 412. The cam pin 132, in its rest position, is shown in phantom line in FIG. 3.

As long as the plate member 430 remains in the illustrated position the pivot point of the (torsion bar) lock pawl 122 remains fixed.

Figure 6:
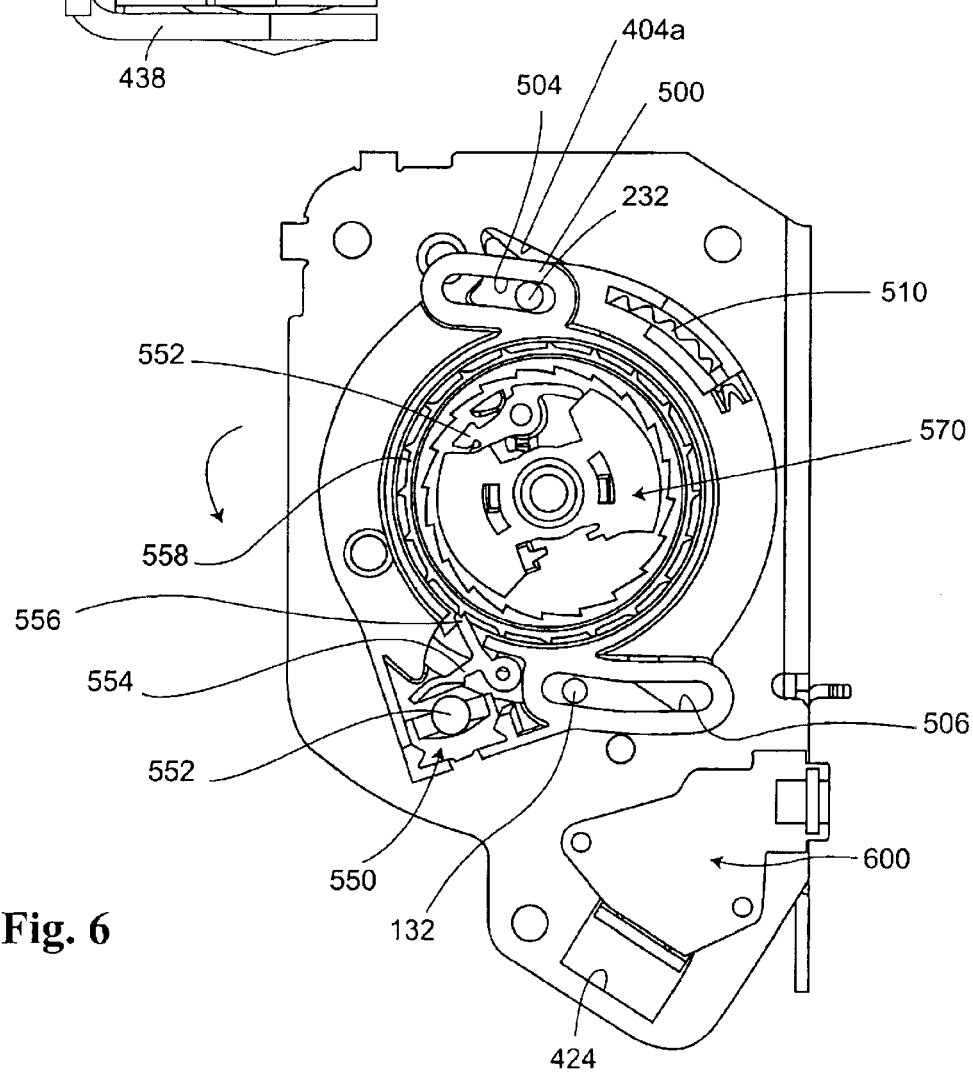
FIG. 6 shows a lock ring in its activated position.
Figure 7:
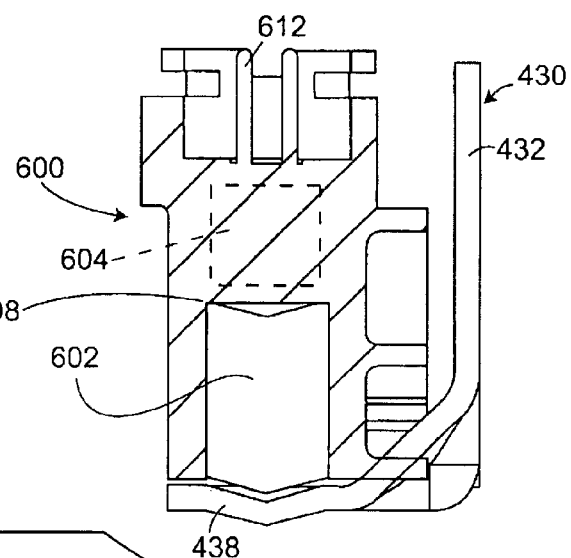
FIG. 7 is a cross-sectional view showing the components of a pyrotechnic unit.

Reference is made to FIG. 6, which superimposes a lock ring 500 on the mechanisms shown in FIG. 3. As mentioned the lock ring 500 is loosely mounted and is rotatable on a portion of the torsion bar. The lock ring includes two cam slots 504 and 506. One of the respective cam pins 132 and 232 is respectively received within each cam slot 506 and 504. During non-emergency periods the lock ring is not rotationally connected to the spool or the torsion bar (and does not rotate) and is biased to a non-activated position by a return spring 510 connected to the nearby frame side.

With the lock ring rotated to an inactive position (which is clockwise offset from that shown in FIG. 6) the lock pawls 122 and 222 are moved radially outward (to their respective deactivated positions) by the operating or interaction of the cam slots and cam pins. In the deactivated positions the lock wheels and lock pawls are disengaged. In this position pawl 222 is rotated counter-clockwise upwardly relative to opening 404 and its cam pin may engage the top stop surface 404a. The lock pawl 122 will be rotated counter-clockwise with its pin 132 placed within the small opening or groove 412.

The retractor 20 includes two types of emergency lock initiating mechanisms, which are common for ELR seat belt retractors. The purpose of these mechanisms is to initiate the lock-up of the retractor in a crash or pending crash. The emergency locking mechanisms include a vehicle sensor 550 and a web sensor 570. When either or both of the vehicle sensor 550 or the web sensor 570 are activated, the lock ring 500 becomes operatively coupled to and is now able to rotate with the spool (or torsion bar) for at least a modest amount. During a crash, the spool will be rotating in a belt unwinding direction. The rotation of the lock ring 500 moves or cams the lock pawl pins 132, 232 radially inward. This action moves the lock pawls 122 and 222 into locking relation with lock teeth of the lock wheels 120 and 220 as shown in FIG. 3.

As shown in FIG. 6 the vehicle sensor 550 is supported on and rotates with the lock ring 500. The vehicle sensor includes a mass (ball) 552 and a sensor pawl 554, which includes lock tooth 556. When vehicle deceleration exceeds a low limit, the ball 552 moves sufficiently to lift the sensor pawl 556 so that it engages with the teeth of a nearby ratchet wheel, which is coupled to the shaft (torsion bar). As soon as this coupling takes place the lock ring 500 is also coupled to the shaft and rotates with it. The web sensor 570 also includes a pawl 572. The web sensor 570 couples the lock ring to the shaft when the seat belt webbing moves out from the spool at a predetermined rate. Any known vehicle and web sensing mechanisms can be used with the retractor 20.

If both lock pawls are in place for example in the positions shown in FIGS. 3 and 6, both lock wheels 120 and 220 are locked and if the accident forces are sufficient to twist the torsion bar, the reaction forces acting on or restraining the seat belt 80 are generated by the torsion bar.

Figure 8:
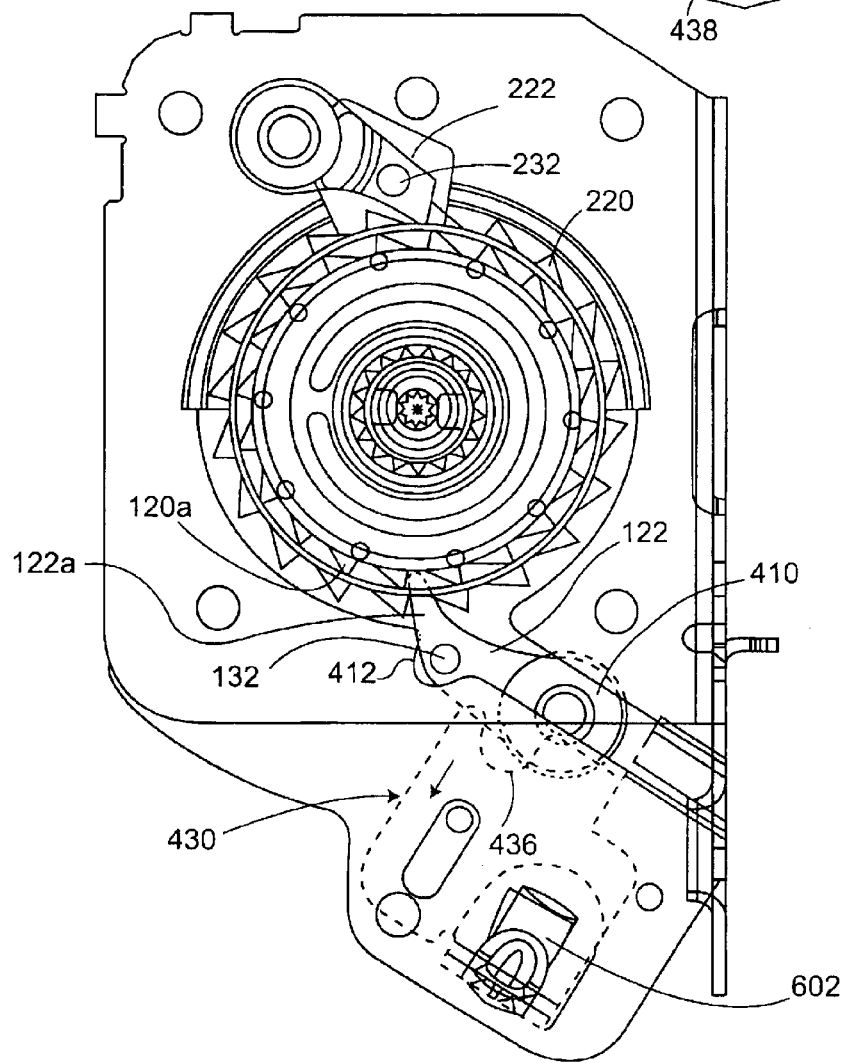
FIG. 8 shows the retractor after the pyrotechnic unit has been moved away from the second pawl.
Figure 12:
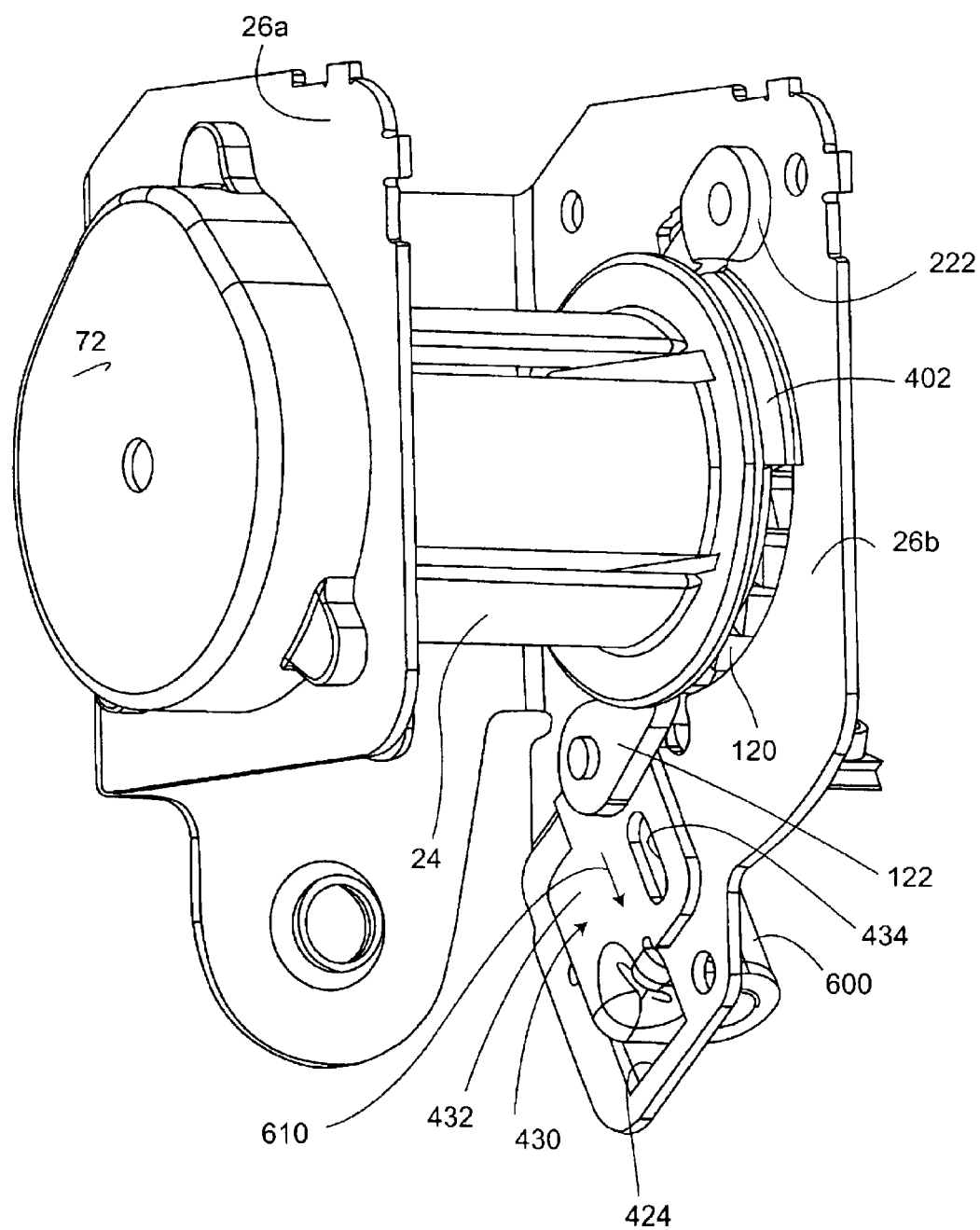
FIG. 12 is an isometric view of the underside of the retractor.

Let it be assumed the occupant classification system, which can be as simple as a weight sensor and associated electronics, determines if a small sized occupant is using the seat belt retractor 20, and a determination is made that an accident is about to occur (crash sensor, radar or sonar sensors and associated electronics, which may be part of the occupant classification system) or has Just begun, then the lock pawl 120 is deactivated. This deactivation is done using the pyrotechnic actuator, element or unit 600. As best seen in FIGS. 6 and 1 the pyrotechnic actuator 600 is mounted on the frame side adjacent to the flange 438 of the plate member 430. The plate member is movable relative to the actuator 600. The pyrotechnic actuator 600 includes a movable piston 602 and a quantity of pyrotechnic material 604, which is ignited in response to control signals input to terminals 612. When the pyrotechnic material 604 (see FIG. 7) is activated, products of combustion are created within the housing 608 and the piston 602 is forcible and quickly pushed outwardly against the flange 438 of the plate member 430. The impact of the piston 602 pushes the plate member 430 to the lower portions of the opening 424 as shown in FIG. 8. More importantly, at this position the plate member 430 slides away (see arrow 610) (also in FIG. 12) from the lock pawl 120 (which remains generally in place) and no longer rotationally supports the lock pawl 120. As mentioned the groove 436 was used to pivotally support the pawl 120.

Almost simultaneously (or slightly before or after) with the activation of the pyrotechnic actuator 600 the emergency locking mechanism, that is the vehicle sensor and/or the web sensor, has begun to operatively connect the lock ring with the spool to initiate the locking up of the retractor. Prior to the activating of the pyrotechnic actuator 600, the pawl 122 should be in its deactivated condition (see FIG. 8) with its cam pin 132 positioned within the groove 412. The subsequent rotation of the lock ring will cam-in the lock pawl 222 into the lock wheel 220. The rotation of the lock ring will also move the cam pin of lock pawl 120 Inwardly and may also place the lock teeth 122a in engagement with the lock wheel teeth 120a, however, in this mode of operation the lock wheel 120 will not become locked.

Figure 9:
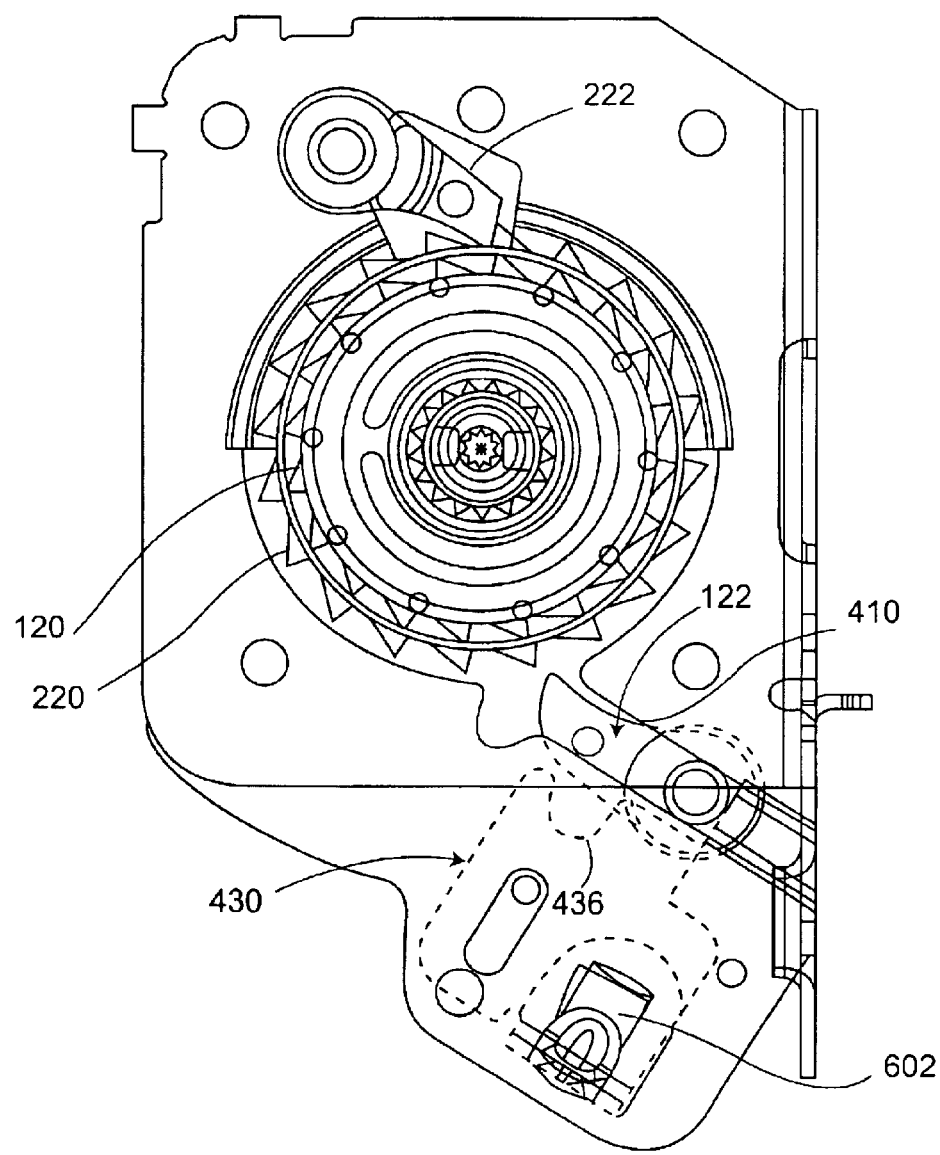
FIG. 9 shows the second pawl moved to a rearward position.

As the lock wheel 120 rotates it may engage the lock pawl 120 and push it rearward into the elongated slot 410, see FIG. 9. This rearward motion is possible because the pivot support of the rivet pin 131 (which defined the pivot point and was previously provided by the plate member 430) is no longer operative because the plate member has been moved away. With lock wheel 220 locked, the lock wheel 120, which is operatively connected to the spool 24 via the torsion bar, will begin to rotate, resisted by the friction forces generated as both lock wheels rotate relative to one another.

In one embodiment of the invention, that is without a counter or mode switching mechanism 700, once the retractor is placed in the friction-generating mode of operation the retractor will remain in this mode of operation even if the vehicle is involved in a subsequent accident.

The retractor 20 can advantageously and optionally include a mode-switching mechanism 700 (see below), which is used as a switch to permit the retractor to revert to the higher output load-limiting characteristic of the torsion bar after the friction-generating mechanism 300 has permitted the opposing surfaces of the lock wheels to rotate relative to one another a defined number of degrees/revolutions.

Reference is briefly made to FIGS. 10a–c, which illustrate the details of a mode switch/mechanism 700. This mechanism 700 uses portions of the lock wheels 120 and 220. The adjacent faces 126 and 226 of the lock wheel 120 and the wheel 220 each include a respective groove 706 and 708 respectively. The lengths of the grooves will define the amount of permitted rotation when the retractor is in the friction-generating mode of operation. Located within each groove 706 and 708 and spanning these grooves, is a pin, bail or oval plug 710. When the locking mechanism 40 is deactivated the retractor Is In the friction-generating mode (since pawl 122 has been moved away from wheel 120). After the belt loads increase such as during an accident, the spool, torsion bar and lock wheel 120 (which is no longer locked) are free to rotate (which depends on the loads transmitted from the occupant to the seat belt to the spool).

In the friction mode of operation, as the lock wheel 120 turns, the faces 126 and 226 rotate relative to each other and the friction force is generated. The mode switch takes advantage of this rotation. As mentioned, the pin 710 is carried between both lock wheels and as the lock wheels rotate relative to one another the pin slides within the grooves 706 and 708. After the lock wheels have rotated a defined amount the pin 710 will be at the respective ends of each of the grooves 706 and 708. This action effectively places lock wheel 120 against a motion stop, which is provided by look wheel 220, which is locked in placed by the action of lock pawl 222. If the accident forces acting on the belt at this time are sufficiently high, the torsion bar will begin to twist (as the lock wheel 120 end of the torsion bar is now locked) and the belt reaction forces are once again defined by the characteristics of the torsion bar.

Figure 11:
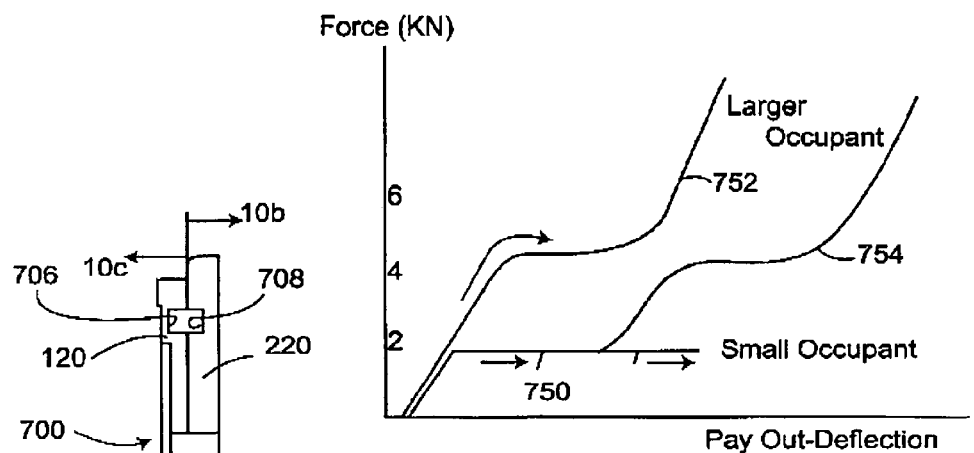
FIG. 11 shows the operation of a mode shifting mechanism.

Reference is briefly made to FIG. 11 wherein curve 750 shows the load limiting in the friction mode of operation. Curve 752 shows the load limiting resulting from the torsion bar mode of operation (with both lock wheels locked). Curve 754 shows the transition in load limiting from frictional to torsion bar mode of operation. Reference is briefly made to the grooves 706 and 708, which have a length of about 360 degrees. As illustrated the lock wheels will have to rotate about two complete revolutions before the mode of operation returns to that of the torsion bar. The number of needed rotations can be controlled by lengthening or shortening the grooves to the desired length.

Many changes and modifications in the above-described embodiment of the invention can, of course, be carried out without departing from the scope thereof. Accordingly, that scope is intended to be limited only by the scope of the appended claims.

What is claimed is:

1. A seat belt retractor system comprising:
a first and a second energy absorption mechanism each of which is selectively actuatable and respectively configured to generate first and second levels of energy absorption and when activated define an output characteristic of the retractor wherein one of the energy absorption mechanisms is a torsion bar;

first means for operatively selecting one or the other energy level and mode shifting means for shifting between the first energy absorption level and the second energy absorption level as a function of the rotation of a spool of the retractor; and a deactivation mechanism for deactivating the torsion bar when the retractor is used by a small sized vehicle occupant.

2. The system as defined in claim 1 wherein the other of the energy absorption mechanisms generates a dissipative frictional force.

3. The system as defined in claim 2 wherein the level of the frictional force is in the range of about 2–3 kN.

4. The system as defined in claim 2 wherein the torsion bar is configured to generate an energy absorption level in the range of about 4–6 kN.

5. The system as defined in claim 1 wherein when a lower first energy absorption level is chosen, the mode shifting means is configured to shift the output characteristic of the retractor to a higher second energy absorption level as a function of retractor spool rotation.

6. The system as defined in claim 1 wherein the deactivation mechanism includes deactivating a locking pawl associated with the torsion bar.

7. The system as defined in claim 1 including a first lock mechanism (40) operatively connected to one end of the torsion bar, the retractor including a first lock member (122) for halting the motion of a first lock wheel.

8. The system as defined in claim 7 wherein the first lock wheel (120) is secured to one side of the torsion bar, the first lock wheel having a first engagement surface (126) on one side thereof associated with a mechanism (300) for generating frictional forces.

9. The system as defined in claim 8 including a second lock mechanism (60) including a second lock wheel (220), having a second engagement surface, operatively associated with the frictional force mechanism (300), the retractor including a second lock member (222) for halting the motion of the second lock wheel.

10. The system as defined in claim 9 including bias means (230) for urging the first and second engagement surfaces toward one another.

11. The system as defined in claim 9 including a single lock ring associated with both the first and the second lock mechanisms for moving each of the first and second lock members (122, 222) into engagement with corresponding lock wheels (120,220).

12. The system as defined in claim 9 wherein the retractor is configured to reactivate the first locking mechanism in response to a signal indicating the occupant being protected is of a small stature including a $5^{th}$ percentile female.

13. The system as defined in claim 12 wherein the retractor is configured to initially operate in a friction force mode of operation to protect the occupant of small stature and wherein the mode shifting means is configured to switch to a torsion bar mode of operation in response to a predetermined number of revolutions of a spool of the retractor.

14. The system as defined in claim 7 wherein the first lock mechanism comprises a first lock pawl, and wherein the retractor is configured to permit the first look pawl to rotate into and out of looking engagement with the first lock wheel and also to translate away from the first look wheel.

15. The system as defined in claim 14 wherein the first lock mechanism is received within a first slot in a frame of the retractor to thereby permit the first locking member to be selectively slid radially away from the first lock wheel under the influence of the first lock wheel.

16. The system as defined in claim 1 wherein the first energy level is less than the second energy absorption level.

17. A seat belt retractor comprising:

a primary and second looking mechanism, each of the primary and secondary locking mechanisms including a lock pawl engageable with a corresponding lock wheel, each lock pawl including a pivot configured to react against the reaction surface when the pawl is under load from its lock wheel and deactivation means for operationally removing one of the reaction surfaces associated with a first of the lock pawls thereby permitting its lock wheel to push the first lock pawl to a position in which the first lock pawl is incapable of locking with the lock wheel when the retractor is used by occupants not in a designated class;

the refractor including at least two load-limiting mechanisms that are selectively employed depending on the size of the occupant.

18. The retractor as defined in claim 17 wherein the energy absorption mechanism include a) a torsion bar and b) a friction-generating mechanism.

19. A seat belt retractor comprising:

a primary and secondary looking mechanism each having a corresponding lock wheel and lock pawl; each lock pawl being rotatable about an axis into locking engagement with its corresponding lock wheel, each of the primary and secondary locking mechanisms being associated with a corresponding load limiting mechanism;

one of the lock pawl configured such that its axis is translatably movable to a new position in direct response to the motion of its lock wheel wherein in this new position the lock pawl is incapable of lockingly engaging with its lock wheel.

20. The retractor as defined in claim 19 wherein the energy absorption mechanisms include a) a torsion bar and b) a friction-generating mechanism.

21. A seat belt retractor system comprising:

a first and a second energy absorption mechanism each of which is selectively actuatable and respectively configured to generate first and second levels of energy absorption and when activated define an output characteristic of the retractor wherein one of the energy absorption mechanisms is a torsion bar;

first means for operatively selecting one or the other energy level and mode shifting means for shifting between the first energy absorption level and the second energy absorption level as a function of the rotation of a spool of the retractor; and a deactivation mechanism for deactivating the torsion bar when the retractor is used by a small sized vehicle occupant, wherein the mode shifting means reactivates the torsion bar subsequent to a determinable amount of spool rotation.

* * * * *